US005461759A

United States Patent [19]

Knoop

[11] Patent Number: 5,461,759

[45] Date of Patent: Oct. 31, 1995

[54] INFORMATION CARRIER FOR CLAMPING ONTO RODS, PARTICULARLY CLOTHES RODS

[75] Inventor: Heinz-Peter Knoop, Solingen, Germany

[73] Assignee: Johann Knupp GmbH & Co., Solingen, Germany

[21] Appl. No.: 236,956

[22] Filed: May 2, 1994

[30] Foreign Application Priority Data

May 4, 1993 [DE] Germany ............................ 9306696 U

[51] Int. Cl.$^{6}$ ................................ A44B 21/00; F16L 3/00

[52] U.S. Cl. ................................ 24/555; 24/545; 24/556; 411/508

[58] Field of Search ............................ 24/555, 556, 543, 24/545, 546, 453, 297; 411/508, 510

[56] References Cited

U.S. PATENT DOCUMENTS

| | | | |
|---|---|---|---|
| 119,938 | 10/1871 | Mellish | 24/545 |
| 1,664,415 | 4/1928 | Herzog | 24/556 |
| 3,758,923 | 9/1973 | Maude | 24/556 |
| 4,566,660 | 4/1986 | Anscher et al. | 24/453 |
| 4,614,321 | 9/1986 | Andre | 24/555 |
| 4,840,334 | 6/1989 | Kikuchi | 411/508 |
| 5,297,322 | 3/1994 | Kraus | 411/508 |

FOREIGN PATENT DOCUMENTS

| | | | |
|---|---|---|---|
| 0476303 | 3/1992 | European Pat. Off. . | |
| 0974290 | 2/1951 | France | 24/545 |
| 7936612 | 5/1980 | Germany . | |
| 3041747 | 5/1982 | Germany . | |
| 3319828 | 5/1987 | Germany . | |
| 3603184 | 6/1987 | Germany . | |
| 6609528 | 10/1967 | Netherlands | 24/545 |

*Primary Examiner*—Victor N. Sakran
*Attorney, Agent, or Firm*—Martin A. Farber

[57] ABSTRACT

An information carrier for clamping onto rods (S), particularly clothes rods or the like, having a holding clamp which, by its two first arms of a resilient material, forms a substantially C-shaped clamping jaw to receive the rod (S), having at least one second arm which extends into the clamping jaw and which, together with a partial region of its side surface, forms a holding region for resilient action on the rod (S). In order to achieve a greater field of use, the second arm (3) be formed resilient on the free end (2') of the first arm (2).

13 Claims, 7 Drawing Sheets

Fig. 2a
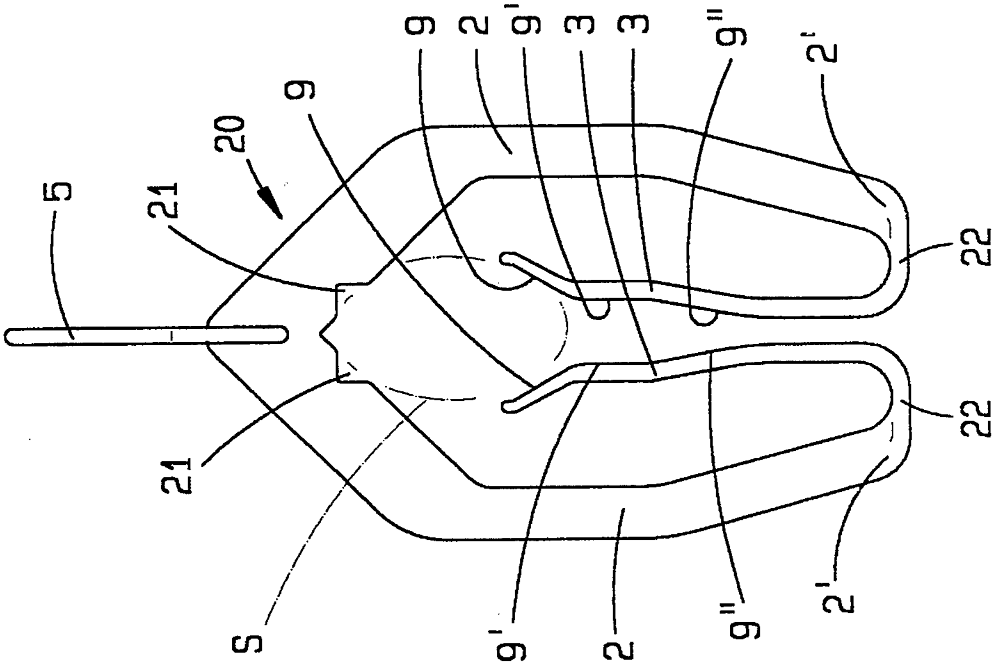
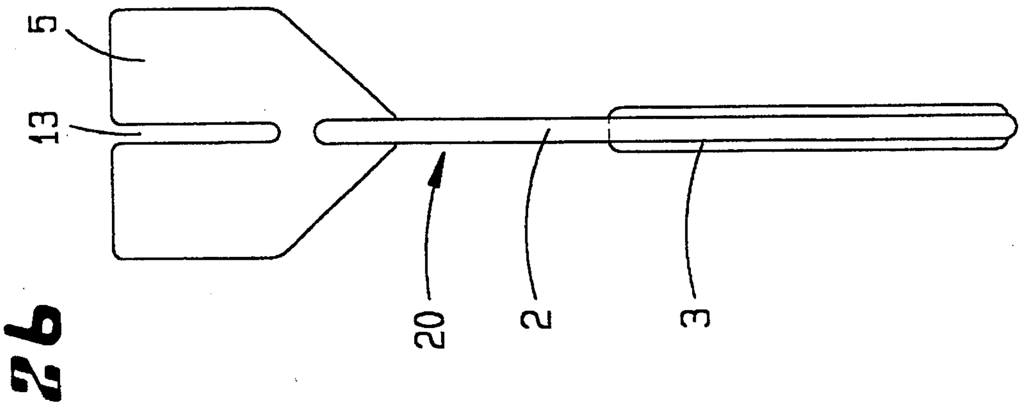
Fig. 2b

Fig. 4a
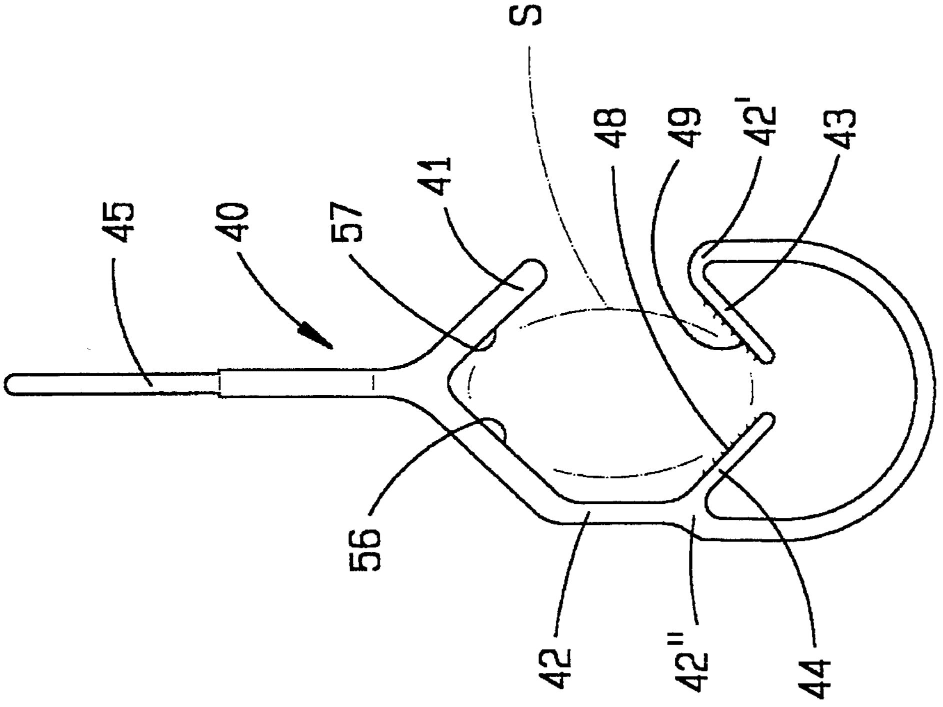
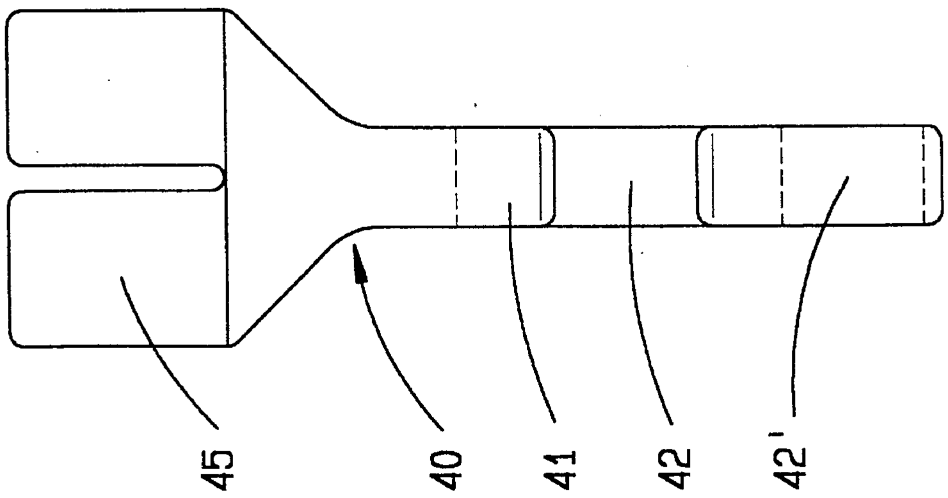
Fig. 4b

Fig. 5a
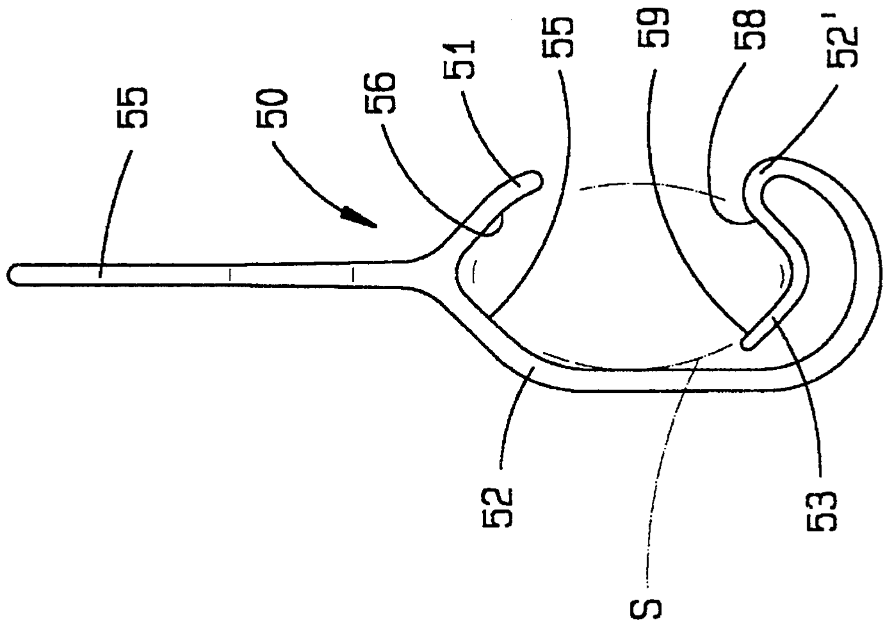
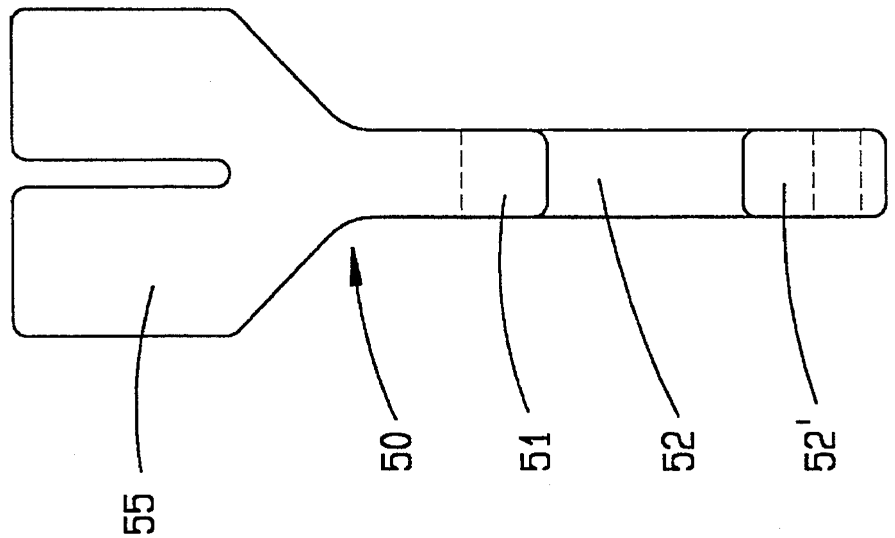
Fig. 5b

INFORMATION CARRIER FOR CLAMPING ONTO RODS, PARTICULARLY CLOTHES RODS

FIELD AND BACKGROUND OF THE INVENTION

The present invention relates to an information carrier for clamping onto rods, particularly clothes rods or the like. Information carriers to which the present invention relates are also known as rod riders and serve, inter alia, for the marking of different sections on clothes rods at sales stands at which the clothing which is hung on the clothes rods is sorted, for instance, by size. For this case of use, a corresponding indication of the size is present on the information carrier. The information carrier can, however, also be used to indicate other information, for instance price. Known rod riders have a holding clamp which forms, for instance, two arms which form a C-shaped clamping jaw which, when placed on a clothes rod, receives the clothes rod. The arms are made of a resilient material so that the rod rider is placed with spring tension on the clothes rod.

In an information carrier in accordance with Patent 30 41 747, a first substantially C-shaped clamping jaw which is formed of two first arms bears a pair of second arms which, due to their elastic attachment to the information carrier, can be clamped over the hook of a clothes hanger.

Based on its design, the known information carrier is suitable only for rods of in each case a given shape and given diameter. Such a rod rider cannot be used on thinner or thicker rods since a sufficient clamping action is not thereby obtained. The cross-sectional area of a rod must correspond substantially to the cross-sectional area of the c-shaped (inner) clamping jaw.

European Patent Application 0 476 303 proposes padding the inner surfaces of the C-shaped clamping opening.

SUMMARY OF THE INVENTION

The object of the present invention therefore is further to develop a rod rider of this type so that it has a greater range of use.

Accordingly the invention provides that the second arm is resiliently developed on the free end of the first arm.

The development in accordance with the invention provides an information carrier for clamping onto rods and can also be used on clothes rods which have a cross-sectional area which is substantially smaller than the cross-sectional area which is partially defined by the first arms. The elastic yieldability of the first arm then adds onto the elastic yieldability of the second arm so that, as a whole, extensive displaceability of the clamping regions is obtained without the shape of the clamping jaw substantially changing. Assurance is nevertheless had that the rod rider can be clipped with sufficient holding force on a clothes rod. It is advantageous if the second arm to be developed on the end of the first arm. With this development, a rod rider which is placed on a clothes rod acts on the top of the closed rod by a partial region of the inner surface of the first arms and on the bottom of it by a partial region of the side surface of the second arm. In order to obtain this action, it is advantageous for the second arm to be so formed on the first arm that an acute angle is present between the two arms. The region of transition from the first arm to the second arm can form a sort of spring hinge. This spring hinge is deformed to a greater or lesser extent depending on the cross section of the clothes rod. In order to obtain optimal adherence of the rod rider on a clothes rod, the second arm has less spring stiffness than the first arm. This can be obtained, for instance, in the manner that the two arms have different thicknesses of material. For this purpose, the second arm can be made weaker than the first arm. It is furthermore provided that a total of two second arms are provided. They can either be on one of the two first arms or one on each of the first arms. With the latter development, it is advantageous for the information carrier to have as a whole a symmetrical shape. The two first arms of the information carrier extend from a common starting point on which there is also formed an information sign which extends in the direction away from the two arms in direction opposite the clamping jaw. The information sign can extend in the direction of the axis of the rod or else transverse to it. A detent opening is preferably provided at the starting point of the two first arms, into which opening a corresponding detent section of the information sign can be clipped. As a result of this development, it is possible for the information sign to be clipped on the rod after the attachment of the information carrier. The detent connection between the information sign and the holding clamp can be effected in such a manner that subsequent replacement of the information signs is possible. In accordance with a preferred further development of the invention, the holding clamp has a run-on bevel at the ends of its two first arms which form the opening of the C-shaped clamping jaw. This run-on bevel is preferably associated with a spreading jaw which adjoins the ends of the first arms. In order to obtain a dependable clamped seat, the distance apart of the facing inner surfaces at the free ends of the first arms is smaller than the greatest distance between opposite inner surfaces of the first arms. In this way, a dependable clamping seat is assured. The run-on bevels are particularly advantageous if the information carrier is to be used on clothes rods the diameter of which is greater than the opening of the clamping jaw. By a sliding of the opposite spreading jaws or of the free ends of the arms on the surface of the clothes rod, a spreading apart of the clamping jaw is then produced. It is furthermore advantageous for the spreading jaws to form with the first arm a rocker which connects a spring joint with the ends of the first arms. In this way, the first arms can form a clamping jaw in the case of which the inner surfaces of the end regions extend substantially parallel to each other in the relaxed position. The holding regions with which the information carrier is held on the rod and therefore the regions which act on the rod to spring load can then be formed exclusively by the inner surfaces of the second arms, in which case, furthermore, the inner surfaces of the spreading jaws can also form a holding region. The inner surfaces of spreading jaw and second arm can, as a whole, form an inwardly directed concave surface so that, with a symmetrical development of the information carrier, the inner surfaces of the facing second arms and of the spreading jaws formed on the open side of the clamping jaw develop the shape of an oval clamp opening.

The second arms preferably lie within the clamping jaw in such a manner that the first arms are not in contact at all with the clothes rod. The first arms can serve merely as spring elements which make possible, at a place spaced from the vertex, a total displacement of the second arms which are themselves elastically deformable. Plastic is preferably employed as material for the rod riders of the invention, The parts can then be produced by injection molding.

BRIEF DESCRIPTION OF THE DRAWINGS

With the above and other and other advantages in view, the present invention will become more clearly understood in connection with the detailed description of preferred embodiments, when considered with the accompanying drawings of which:

FIG. 2*a* is a side view of a second embodiment;

FIG. 2*b* is an elevation of a second embodiment;

FIG. 4*a* shows a fourth embodiment in side view;

FIG. 4*b* shows a fourth embodiment in elevation;

FIG. 5*a* shows a fifth embodiment in elevation; (sic)

FIG. 5*b* shows a fifth embodiment in elevation;

DETAILED DESCRIPTION OF THE PREFERRED EMBODIMENTS

Figure 1A:
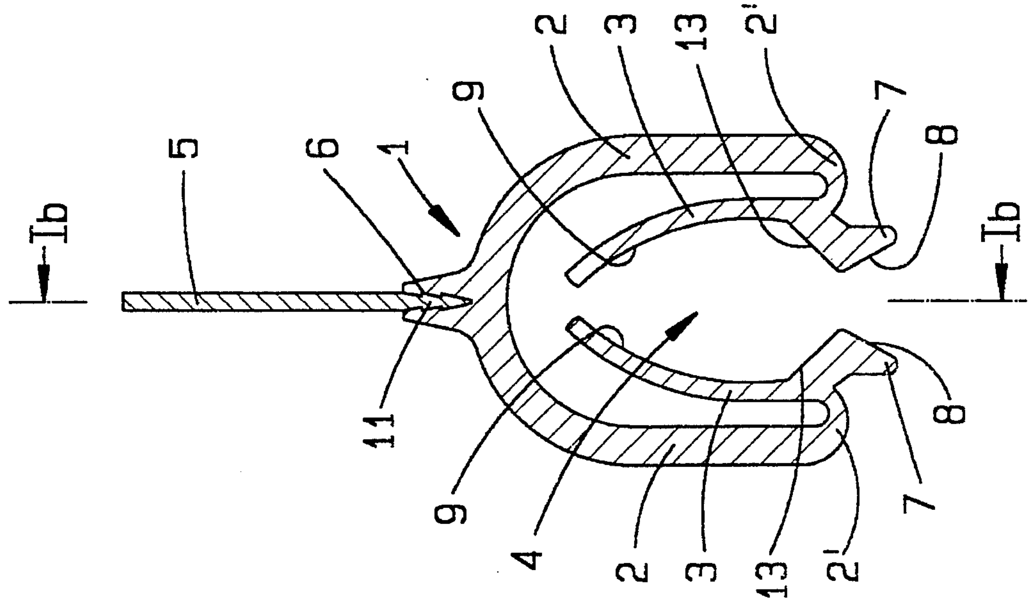
FIG. 1*a* shows a first embodiment in cross section.
Figure 1B:
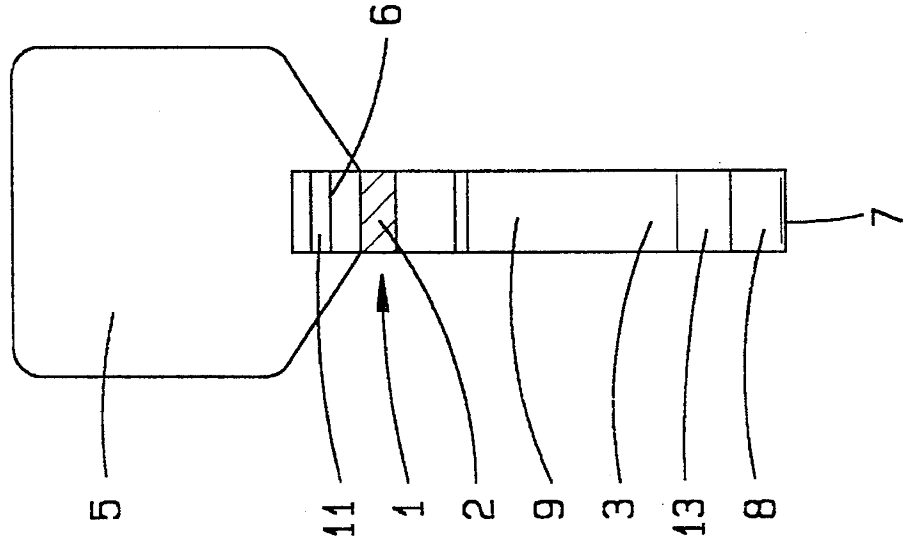
FIG. 1*b* shows a first embodiment in elevation.

In the first embodiment, shown in FIGS. 1*a* and 1*b*, the information carrier has a holding clamp which is formed by the two first arms 2. The first arms together form a substantially C-shaped clamping jaw. In this connection, the end regions of the first arms 2 extend substantially parallel to each other so that these first arms, by themselves, have a U-shape. At the free ends 2' of the first arms second arms 3 are formed. The attachment is such that the second arms and the first arms 2 can yield resiliently. The first arms 2 and the second arms 3 formed thereon form in the region of the attachment 2' an acute angle which, in the embodiment shown, amounts to about 180°. By their inner surfaces, the second arms form holding regions for resilient action on a clothes rod, which can be received in the clamping jaw 4.

In the end region 2' of the first arms 2, i.e in the region where the second arm 3 is developed, spreading jaws 7 which extend into the opening of the clamping jaw are formed. These spreading jaws 7 have inwardly opening run-on bevels 8. At an angle of about 90° to these run-on bevels 8, each of the spreading jaws 7 have a holding region 13 which can act on the surface of a clothes rod. These holding regions 13 pass into the inner surfaces of the second arms 3 and therefore into their holding region 9. By these inner surfaces 13, 9 of the facing second arms 3 and spreading jaws 7 there is developed, as a whole, an approximately oval clamping space 3 for receiving an oval clothes rod.

Upon the placing of the rod rider 1 on a clothes rod, the ends 2' of the first arms are first of all moved apart as a result of the surface of the clothes rod striking against the run-on bevels 8. The material of the first arms is so elastically resilient that, after the end of this action, the bars can again move back into their original position. Different cross sections of clothes rods can be compensated for in the manner that, on the one hand, the ends 2' can move apart. In this way, a four-point support of the information carrier on the clothes rod is assured.

The holding clamp has a detent opening 6 in the vertex region of the first arms 2'. This detent opening 6 corresponds to a detent section 11 in an information sign 5. The information sign 5 can, accordingly, be clipped subsequently onto the holding clamp. In the same way, a subsequent change of information signs is possible. This aspect of the invention is of independent importance and can be realized even without the special development of the clamping jaw of the holding clamp.

FIGS. 2*a* and 2*b* show a second embodiment of the invention. This embodiment, in the same way as the embodiment shown in FIGS. 1*a* and 1*b*, is also substantially cylindrical and is formed of plastic. The second arms 3' also extend from the free ends 2' of the first arms 2 and protrude into the inside of the C-shaped clamping jaw. While in the first embodiment the distance between the two second arms 3 is greatest in the region of their free ends, in the second embodiment the distance between the two second arms 3 is smallest in the region of their free ends. While in the first embodiment, the clothes rod is acted on solely by the inner surface 9 of the second arms 3 or the inner surfaces 13 of the spread jaws 7, in the second embodiment the clothes rod is acted on by the vertex region of the first arms and by the inner surfaces 9 of the second arms 3.

As can be noted, in particular, from FIG. 2*a*, the angular recesses 21 in the vertex region of the first arms 2 are provided, they being intended to produce a linear action on the clothes rod S. In this showing, a relatively small clothes rod S is received in the clamping jaw. The holding region associated with the second arms 3 is therefore formed by the inner surface 9 associated with the free end of the second arms 3. If a clothes rod of larger cross section is received in the clamping jaw, the second arms 3 spread further apart so that the holding regions 9' and 9" remote from the free ends act on the clothes rod. The second arms 3 are formed also in this embodiment via an elastic hinge 22 on the free ends 2' of the first arms 2. In this case, several holding regions located one behind the other are provided, they entering into action depending on the diameter or cross-sectional shape of the rod.

Figure 3A:
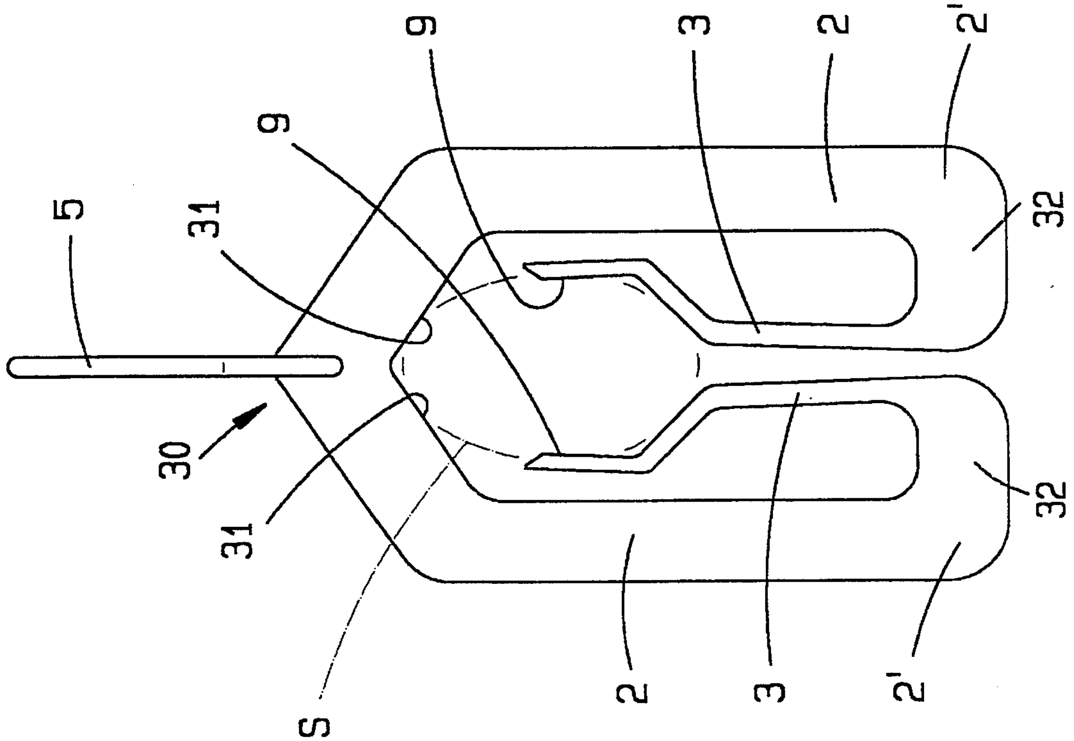
FIG. 3*a* shows a third embodiment in side view.
Figure 3B:
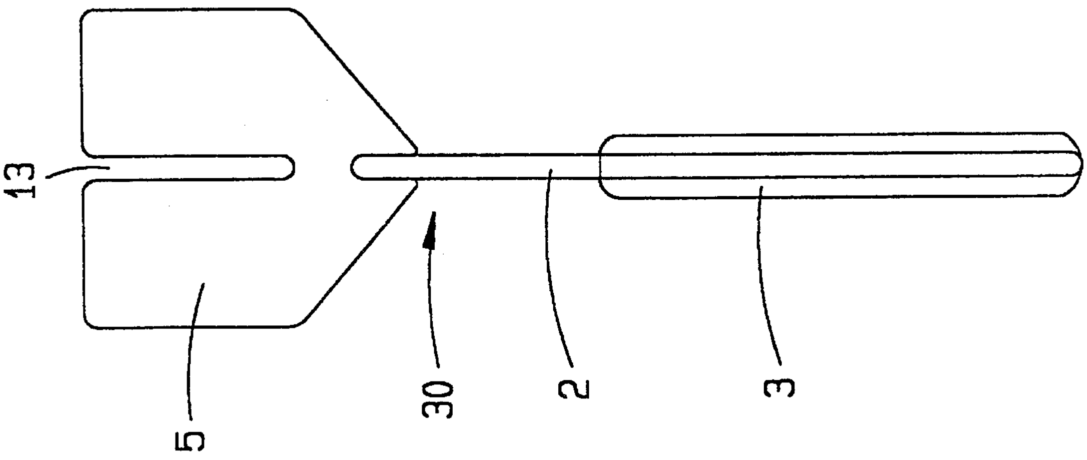
FIG. 3*b* shows a third embodiment in elevation.

The third embodiment, shown in FIGS. 3*a* and 3*b*, has substantially the same features as Embodiments 1 and 2, for which reason identical reference numerals are also used here for the same parts. In this case also, the clothes rod S, in the same way as in Embodiment 2, is acted on by holding regions 31 in the vertex region of the second arms. The second arms extend substantially parallel to each other. On their free ends 2' there are developed the second arms 3 which, as in the case of the second embodiment, extend in V-shape towards the inside. Different from in the second embodiment, the spring hinges 32, the attachment regions 32, are thicker so that the spring resiliency of the second arms 3 is determined essentially by the thickness of the material of the second arms 3.

Embodiments 4, 5 and 6, shown in FIGS. 4*a* to 6*a*, do not have a symmetrical development as in the case of Embodiments 1 to 3. Here, the opening of the C-shaped clamping jaw is not arranged opposite the information sign but to the side of it. This is made possible in the manner that one of the first arms 41, 51, 61 is made shorter than the other first arm 62, 42, 52. The latter surrounds the clothes rod 8 over a circumferential region which is greater than 180°.

In the embodiment shown in FIGS. 4*a* and 4*b*, two second arms 43, 44 are provided, each of which is formed on the longer first arm 42. While the second arm 43 is formed on the free end 42' of the first arm 42 and extends inward, the other second arm 44 extends from the opposite side of the substantially hook-shaped first arm 42 into the inside of the clamping jaw. The point of attachment 42" lies at approximately the same height as the free end 42' arranged on the opposite side. Further holding regions 5, 6 (sic) are associated with the second arms 41 and 42 respectively and lie in the region of the vertex of the first arms. An information sign 45 adjoins the vertex region of this information carrier 40.

FIGS. 5*a* and 5*b* show a fifth embodiment, in which the information carrier is designated 50. Here, the second arm 53 which forms two holding regions 58 and 59 is developed on the free end 52' of the longer first arm 52. The second arm 53 extends substantially parallel to the lower curvature of the first arm 52 and itself has a strong curvature. The two other holding regions 55, 56, as in the case of Embodiment 4, are formed by the inner surfaces of the first arms 51, 52 in their vertex region.

Figure 6A:
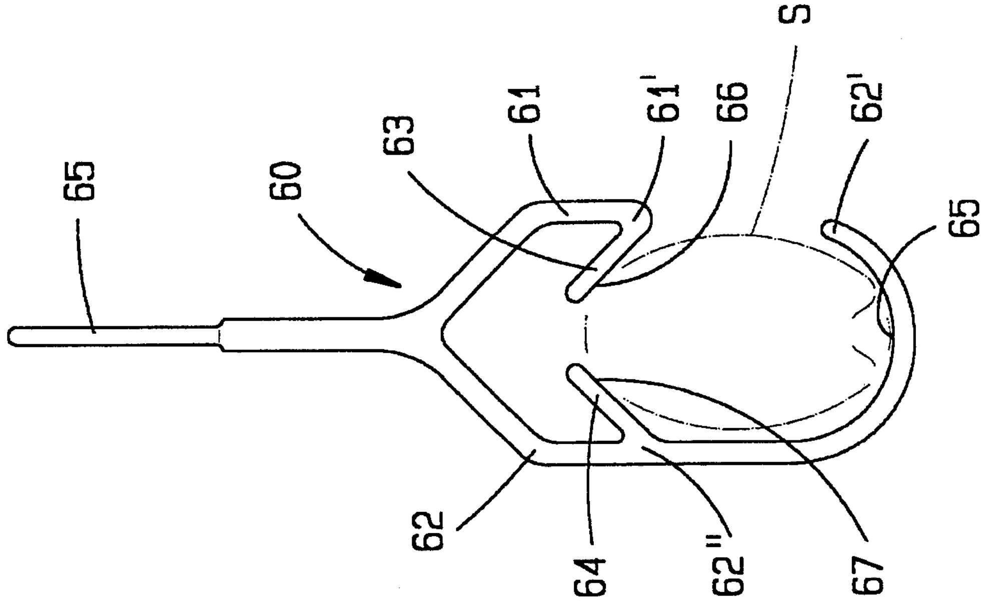
FIG. 6*a* shows a sixth embodiment in elevation.
Figure 6B:
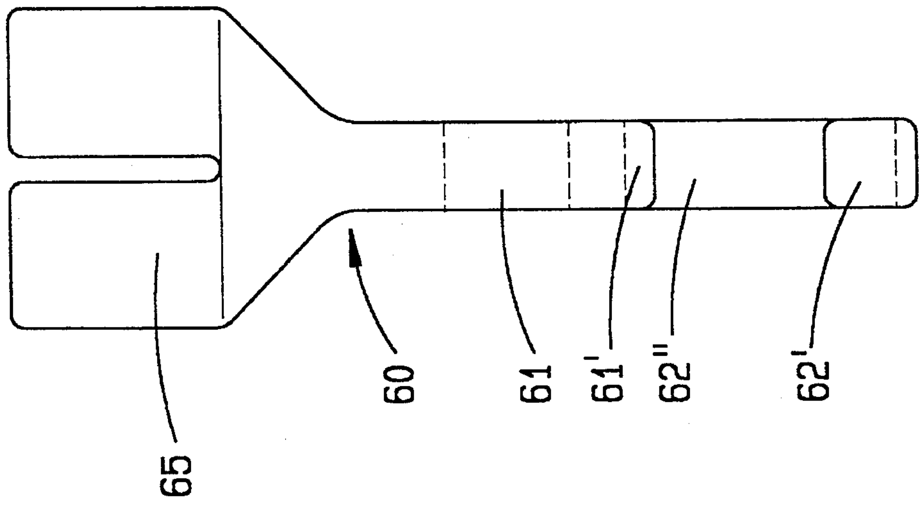
FIG. 6*b* shows a sixth embodiment in side view.

In the sixth embodiment, shown in FIGS. 6*a* and 6*b*, a second arm 63 is formed on the free end 61' of the first arm 61. A second arm 64 is developed in a central region 62' of a first arm 62, the points of attachment 62' and 62" being at approximately the same distance from the vertex region of the two first arms 61, 62. The first arm 62 extends further below the articulation point 62" and forms a curvature which lies opposite the holding regions 66, 67 of the second arms 63, 64. The inner surface of this curvature forms the third holding region 65. Between the free end 62' of the arm 62 and the free end 61' of the arm 61 the lateral opening of the C-shaped clamping jaw is formed.

The clampable information panel for rod systems has a plastic plate of different thicknesses of material. With its arms, it has two gripping arms 2 which, over a spring path which is formed by the arms 3, grips around different profiles. The information surface 5 is in this connection at an angle of 90° to the plastic plate. The spring force is assured by the resilience of the arms 3. The latter features concern, in particular, Embodiments 2 and 3. In Embodiment 1, the four plastic arms as a whole form an outer clamp and an inner clamp in order in this way to be locked with double-spring action on different profiles. In Embodiments 4 and 6, the information panel 45, 65 has a foot which terminates in an arc which grips around the rod profile. Into the arc there extend two opposite spring arms 43, 44 and 64, 63. These spring arms are each at an angle of 45° to the vertical. Embodiment 5 also concerns a clampable information sign, in the case of which the information surface 55 has a foot which surrounds the most different profiles and can be locked in direction by its spring tabs 51, 52, 53. The invention has the advantage that the new information carrier (rod rider) which is remote from the foot can surround all current rod profiles. In this connection, a dependable seat is assured while taking up only a small amount of space. The rod rider furthermore can be applied with little force, is easier to position, and is simpler to remove. The latter properties are affected in positive manner, in particular by the double spring. Furthermore, there is the advantage that the rod rider can be provided with variable information surfaces, in which connection the information sign carrier and the information sign itself can be separate. By the improved spring action, damage upon removal of the rod rider from a clothes rod is furthermore substantially prevented, so that a high degree of reuse is obtained.

Figure 7:
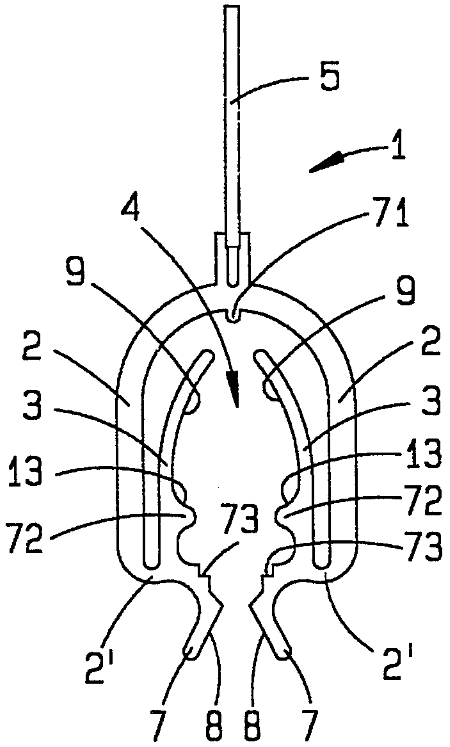
FIG. 7 shows a seventh embodiment.
Figure 8:
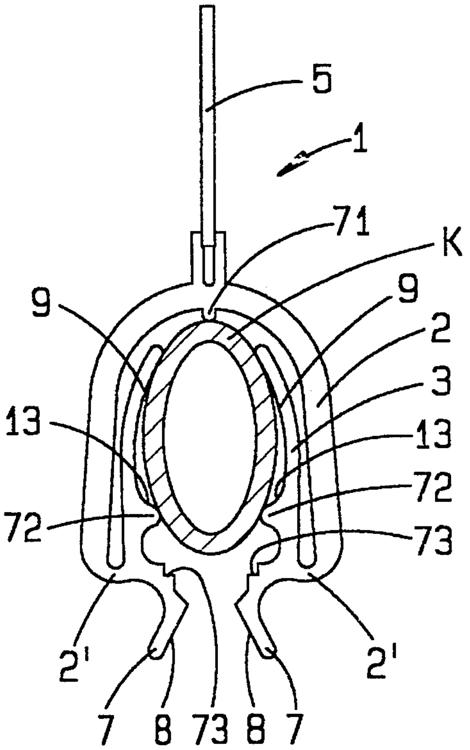
FIG. 8 shows an embodiment in accordance with FIG. 7, placed on a clothes rod of oval cross section.
Figure 9:
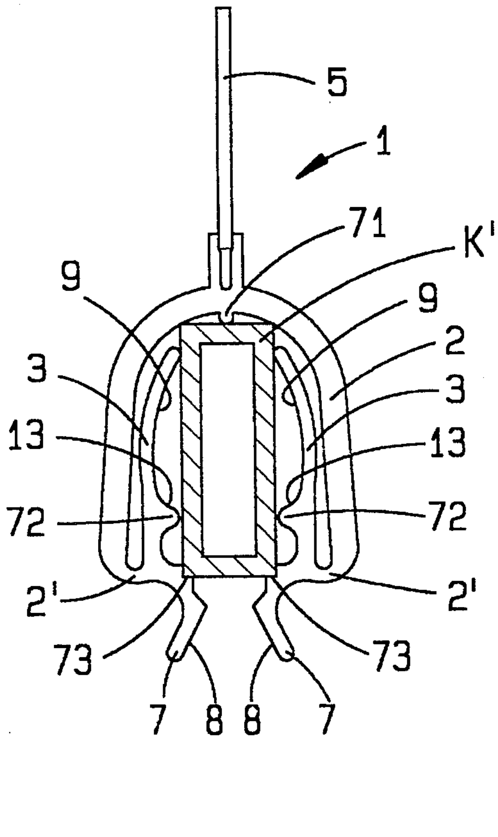
FIG. 9 shows the embodiment of FIG. 7, placed on a clothes rod of rectangular cross section.

The embodiment shown in FIGS. 7–9 corresponds substantially to the first embodiment, shown in FIGS. 1*a* and 1*b*. Here, the same elements have been provided with the same reference numerals. The embodiment in accordance with FIGS. 7–9 is characterized by the fact that it can be used both on clothes rods of oval cross section and on clothes rod of rectangular cross section. For this purpose, an inwardly facing bulge 72 is provided on the inner surfaces 9 of the second arms 3, in each case adjacent the attachment region 2'. This bulge 72 consists of an accumulation of the plastic material on the second arm 3. This bulge 27 forms the resting surface forming the holding region 13, on which a part of the clothes rod K of oval cross section can rest. In addition, this embodiment has a support projection 71 which is arranged in the vertex region of the two arms 2 and also extends into the inside of the U. The device rests on a clothes rod K by this projection 71. In this way, a five-point support is obtained as a whole. The supporting is effected with the supporting projection 71 and the inner surfaces 9 of the arms 2, namely with their outer regions, and, in addition to this, by the holding regions 13 of the accumulations of material 72.

Furthermore, the embodiment has rectangular recesses 73 in the region of the spreading jaws 7. These recesses 73 open towards the inside of the U arm and are arranged in the region of the spring ends 2' of the arms 2, and therefore in the root region of the second arms 3. The corners of a clothes rod K of rectangular cross section can extend into these rectangular recesses 73. In this connection, the vertices of the accumulations of material 72 can also press against the wide side of the clothes rod K'. The wide surfaces of the clothes rod K' are, however, preferably acted on by the free ends of the second arms 3. The upper narrow surface of the clothes rod K' is acted on by the resting projection 71.

I claim:

1. An information carrier for clamping on rods and having a holding clamp on the outer surface of said carrier for holding an information placard, and having a holding clamp on the outer surface of said carrier for holding an information placard, the carrier comprising:

two first arms of a spring material forming a substantially c-shaped clamping jaw to receive the rod;

two second arms formed resiliently on respective ones of said first arms, each of said second arms having a concave side surface, each of said second arms extending freely into the clamping jaw and forming, by a part of a region of its concave side surface, an oval holding region for resilient engagement of the rod; and two spreading jaws extending from end regions of respective ones of said first arms, the spreading jaws having run-on bevels arranged on opposite sides of an opening of the c-shaped clamping jaw defining means for opening said c-shaped clamping jaw.

2. An information carrier according to claim 1, wherein each of the second arms forms an acute angle with a respective one of the first arms.

3. An information carrier according to claim 1, wherein each of the second arms is of less spring stiffens than a respective one of the first arms.

4. An information carrier according to claim 1, wherein there is a total of two of said second arms.

5. An information carrier according to claim 1, wherein the clamping jaw is of symmetrical shape.

6. An information carrier according to claim 1, wherein said holding clamp comprises a detent opening disposed on the outer surface of said clamping jaw for a detachable reception of the placard.

7. An information carrier according to claim 1, wherein the run-on bevels of the spreading jaws have diverging bevel surfaces to facilitate opening of the clamping jaw.

8. An information carrier according to claim 1, wherein each of the spreading jaws, together with a respective one of the second arms, develops a rocker which is resiliently formed on a respective one of the first arms.

9. An information carrier according to claim 1, wherein each of said second arms has an accumulation of material which extends into the clamping jaw to form a holding surface.

10. An information carrier according to claim 9, wherein the accumulations of material of the respective second arms are arranged opposite each other.

11. An information carrier according to claim 1, wherein each of said second arms has a rectangular recess located at an opening of the clamping jaw to receive an edge of a clothes rod of rectangular cross section.

12. An information carrier according to claim 11, wherein the rectangular recesses of the respective second arms are arranged opposite each other.

13. An information carrier according to claim 1, further comprising a resting projection located at a U-vertex of the clamping jaw.

* * * * *